US012350925B2

(12) United States Patent
Scherdel et al.

(10) Patent No.: US 12,350,925 B2
(45) Date of Patent: Jul. 8, 2025

(54) DEVICE AND METHOD FOR CONTROLLING THE HEATING ELEMENTS OF A DRYING UNIT OF A PRINTING DEVICE

(71) Applicant: Canon Production Printing Holding B.V., Venlo (NL)

(72) Inventors: Stefan Scherdel, Markt Schwaben (DE); Michael Mayr, Munich (DE)

(73) Assignee: Canon Production Printing Holding B.V., Venlo (NL)

( * ) Notice: Subject to any disclaimer, the term of this patent is extended or adjusted under 35 U.S.C. 154(b) by 152 days.

(21) Appl. No.: 18/241,430

(22) Filed: Sep. 1, 2023

(65) Prior Publication Data

US 2024/0075753 A1 Mar. 7, 2024

(30) Foreign Application Priority Data

Sep. 1, 2022 (DE) ..................... 10 2022 122 204.7

(51) Int. Cl.

*B41J 11/00* (2006.01)
*B41J 29/38* (2006.01)

(52) U.S. Cl.

CPC ............. *B41J 11/002* (2013.01); *B41J 29/38* (2013.01)

(58) Field of Classification Search

CPC ...... B41J 11/002; B41J 29/38; B41J 11/00222
See application file for complete search history.

(56) References Cited

U.S. PATENT DOCUMENTS

2012/0308252 A1 12/2012 Shimura
2017/0334216 A1* 11/2017 Pappenberger ...... B41J 11/0022

FOREIGN PATENT DOCUMENTS

DE 102016109244 B4 7/2019
WO 2014079493 A1 5/2014

* cited by examiner

*Primary Examiner* — Bradley W Thies
(74) *Attorney, Agent, or Firm* — The Webb Law Firm

(57) ABSTRACT

A device is described that is designed to activate the different heating elements of a drying unit respectively per block within a heating cycle in order to enable an operation of the drying unit that is particularly power-efficient and gentle on the mains.

10 Claims, 4 Drawing Sheets

FIG 3

300

201 205 306

| L | T | S | V | M | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|---|---|---|---|---|
| 4 | 1 | 0 | 0 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 8 | 2 | 1 | 1 | 2 | 0 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 40 | 10 | 3 | 3 | 3 | 0 | 0 | 0 | 1 | 1 | 1 | 1 | 1 | 1 | 1 | 1 | 1 | 1 | 0 | 0 | 0 | 0 | 0 | 0 | 0 | 0 | 0 | 0 | 0 | 0 |
| 40 | 10 | 13 | 13 | 4 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 0 | 0 |
| 36 | 9 | 23 | 23 | 5 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 1 | 1 |
| 40 | 10 | 32 | 7 | 6 | 0 | 0 | 0 | 0 | 0 | 0 | 0 | 1 | 1 | 1 | 1 | 1 | 1 | 1 | 1 | 1 | 1 | 0 | 0 | 0 | 0 | 0 | 0 | 0 | 0 |
| 40 | 10 | 42 | 17 | 7 | 1 | 1 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 |
| 36 | 9 | 52 | 2 | 8 | 0 | 0 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 |
| 36 | 9 | 61 | 11 | 9 | 0 | 0 | 0 | 0 | 0 | 0 | 0 | 0 | 0 | 0 | 0 | 1 | 1 | 1 | 1 | 1 | 1 | 1 | 1 | 1 | 0 | 0 | 0 | 0 | 0 |
| 36 | 9 | 70 | 20 | 10 | 1 | 1 | 1 | 1 | 0 | 0 | 0 | 0 | 0 | 0 | 0 | 0 | 0 | 0 | 0 | 0 | 0 | 0 | 0 | 0 | 1 | 1 | 1 | 1 | 1 |
| 36 | 9 | 79 | 4 | 11 | 0 | 0 | 0 | 0 | 1 | 1 | 1 | 1 | 1 | 1 | 1 | 1 | 1 | 0 | 0 | 0 | 0 | 0 | 0 | 0 | 0 | 0 | 0 | 0 | 0 |
| | | | | | 4 | 4 | 4 | 4 | 4 | 4 | 4 | 4 | 4 | 4 | 4 | 4 | 4 | 3 | 3 | 3 | 3 | 3 | 3 | 3 | 3 | 3 | 3 | 3 | 3 |

305

DEVICE AND METHOD FOR CONTROLLING THE HEATING ELEMENTS OF A DRYING UNIT OF A PRINTING DEVICE

CROSS-REFERENCE TO RELATED APPLICATION

This application claims priority to German Patent Application No. 10 2022 122 204.7 filed Sep. 1, 2022, the disclosure of which is hereby incorporated by reference in its entirety.

BACKGROUND OF THE INVENTION

Field of the Invention

The invention relates to a device and a corresponding method for controlling the heating elements of a drying unit for drying a recording medium, in particular for use in an inkjet printing device.

Description of Related Art

Inkjet printing devices can be used for printing to recording media, for example paper. For this purpose, one or more nozzles are used in order to fire ink droplets onto the recording medium, and thus to generate a desired print image on the recording medium.

An inkjet printing device can comprise one or more drying units in order to dry the recording medium after application of the print image and to thereby fix the applied ink on the recording medium. A drying unit can have a drying route with a plurality of drying modules. The individual drying modules can be configured to blow a warmed gaseous drying medium, in particular air, toward the surface of the recording medium in order to dry said recording medium. For this purpose, the individual drying modules can respectively have a heating element.

Within the scope of the drying of a printed recording medium, the temperature of the recording medium can be detected and the individual drying modules—in particular the heating elements of the individual drying modules—can be controlled and/or regulated depending on the detected temperature. The temperature of the recording medium can thereby be detected, for example in an unprinted region of the recording medium, in order to provide consistent conditions for the temperature detection, and thus in order to enable a reliable and robust control and/or regulation of the drying process.

The heating elements of the individual drying modules of a drying unit typically have a relatively high electric power consumption, which can lead to a relatively high loading of a power supply network, in particular of a three-phase alternating current supply network.

SUMMARY OF THE INVENTION

The present document deals with the technical object of enabling a power-efficient operation of a drying unit for a printing device via which an especially light loading of a power supply network is effected.

According to one aspect, a device is described for controlling a plurality of heating elements of a drying unit to dry a recording medium printed to by a printing device. The device is configured, for each of the plurality of heating elements, to determine a respective number of periods of an alternating current for which the respective heating element should be active in a heating cycle, wherein the heating cycle comprises a sequence of successive periods of the alternating current. The device is also configured to determine a heating block within the heating cycle for the respective heating element, which heating block has precisely the number of periods of the alternating current that was determined for the respective heating element, and to effect that the respective heating element is active in the zero, one, or more periods of the heating cycle that are indicated by the determined heating block, and is inactive in the zero, one, or more periods of the heating cycle outside of the determined heating block.

According to a further aspect, a method is described for controlling a plurality of heating elements of a drying unit for drying a recording medium printed to by a printing device. The method comprises, for each of the plurality of heating elements, the determination of a respective number of periods of an alternating current for which the respective heating element should be active in a heating cycle, wherein the heating cycle comprises a sequence of successive periods of the alternating current. The method further comprises the determination of a heating block within the heating cycle for the respective heating element, which heating block has precisely the number of periods of the alternating current as was determined for the respective heating element, and effecting that the respective heating element is active in the zero, one, or more periods of the heating cycle that are indicated by the determined heating block, and is inactive in the zero, one, or more periods of the heating cycle outside of the determined heating block.

BRIEF DESCRIPTION OF THE DRAWINGS

The terms Fig., Figs., Figure, and Figures are used interchangeably in the specification to refer to the corresponding figures in the drawings.

In the following, examples are described in detail using the schematic drawing. Thereby shown are:

FIG. 3 an example of a distribution of alternating current periods of a heating cycle to the different heating elements of a drying unit.

DESCRIPTION OF THE INVENTION

Figure 1A:
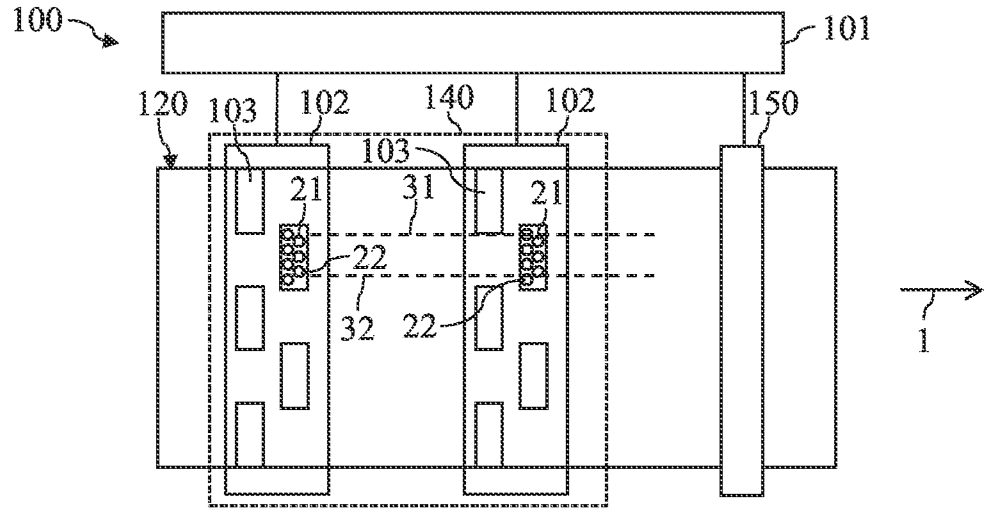
FIG. 1*a* a block diagram of an example of an inkjet printing device having a drying or fixing unit.

The printing device 100 depicted in FIG. 1*a* is designed for printing to a recording medium 120 in the form of a sheet or page or plate or belt. The recording medium 120 can be produced from paper, paperboard, cardboard, metal, plastic, textiles, a combination thereof, and/or other materials that are suitable and can be printed to. The recording medium 120 is guided along the transport direction 1, represented by an arrow, through the print group 140 of the printing device 100.

In the depicted example, the print group 140 of the printing device 100 comprises two print bars 102, wherein each print bar 102 can be used for printing with ink of a defined color, for example black, cyan, magenta, and/or yellow, and MICR ink if applicable. Different print bars 102 can be used for printing with respective different inks. Furthermore, the printing device 100 comprises at least one fixing or drying unit 150 that is configured to fix a print image printed onto the recording medium 120.

A print bar 102 can comprise one or more print heads 103 that, if applicable, are arranged in a plurality of rows side-by-side in order to print the dots of different columns 31, 32 of a print image onto the recording medium 120. In the example depicted in FIG. 1*a*, a print bar 102 comprises five print heads 103, wherein each print head 103 prints the dots of a group of columns 31, 32 of a print image onto the recording medium 120.

In the embodiment illustrated in FIG. 1*a*, each print head 103 comprises a plurality of nozzles 21, 22, wherein each nozzle 21, 22 is configured to fire or eject ink droplets onto the recording medium 120. For example, a print head 103 of the print group 140 can comprise multiple thousands of effectively utilized nozzles 21, 22 that are arranged along a plurality of rows transverse to the transport direction 1 of the recording medium 120. Dots of a line of a print image can be printed onto the recording medium 120 transverse to the transport direction 1, i.e. along the width of the recording medium 120, by means of the nozzles 21, 22 of a print head 103 of the print group 140.

The printing device 100 also comprises a control unit, for example an activation hardware and/or a controller, that is configured to drive actuators of the individual nozzles 21, 22 of the individual print heads 103 of the print group 140 in order to apply the print image onto the recording medium 120 depending on print data. The print data can respectively indicate, for each nozzle 21, 22, i.e. for each column 31, 32 of the print image and for each line of the print image, whether an ink ejection should take place or not, and if applicable what quantity of ink should be ejected.

As presented above, the printing device 100 can comprise a drying unit 150 that is configured to dry the recording medium 120 after application of the ink by the one or more print bars 102, and therewith to fix the applied print image onto the recording medium 120. For this purpose, the drying unit 150 can be controlled by the control unit 101 of the printing device 100. For example, the drying can take place depending on the quantity of the applied ink and/or depending on a type of the recording medium 120. For example, the temperature and/or the volumetric flow of the gaseous drying medium can be adapted depending on the quantity of the applied ink and/or depending on a type of the recording medium 120. In particular, the temperature and/or the volumetric flow of the gaseous drying medium can be set and/or adapted depending on a measured value of the temperature of the unprinted recording medium 120. Alternatively or in combination, the temperature of the recording medium 120 in the printed region can also be measured. The temperature of the recording medium 120 for an unprinted region can then be calculated by means of the ink quantity applied there, the grammage, the printing speed, and/or the nozzle box pressure or the drying module pressure.

Figure 1B:
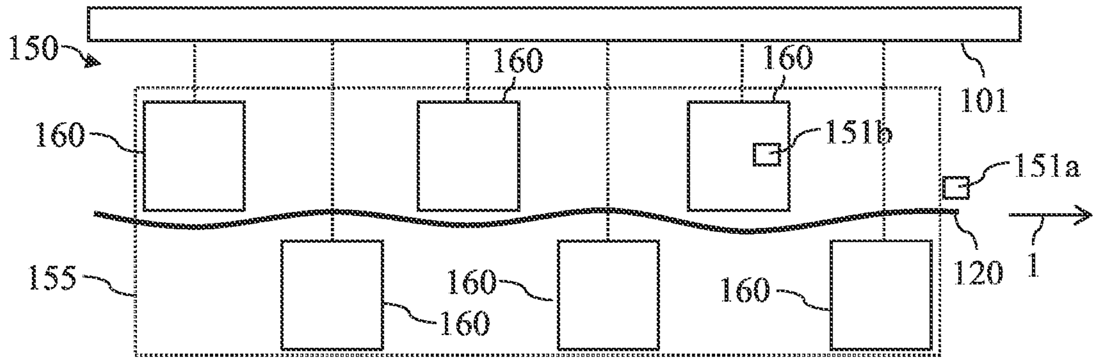
FIG. 1*b* a block diagram of an example of a drying unit for an inkjet printing device.

The drying unit 150 depicted in FIG. 1*b* comprises a plurality of drying modules 160 that are arranged along a drying route on both sides of the (typically belt-shaped) recording medium 120 and that are respectively configured to blow a gaseous drying medium, typically warmed air, onto the surface of the recording medium 120. The drying route with the drying modules 160 is thereby arranged in a housing 155 of the drying unit 150. Via the blowing with a gaseous drying medium, the print image on a recording medium 120 can be dried gently and reliably along the drying route of the drying unit 150. The float drying described here is one possible embodiment for the drying of the recording medium. The method according to the invention, or the device according to the invention, can use any type of drying modules.

Figure 1C:
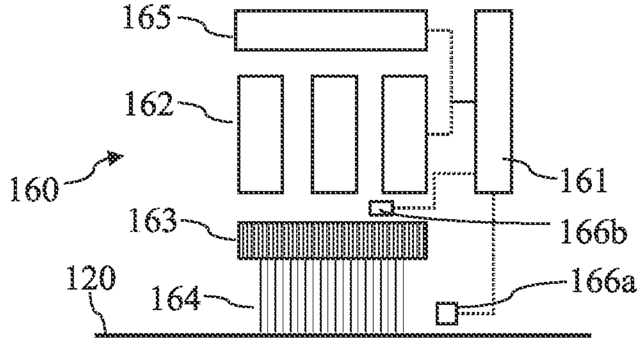
FIG. 1*c* a block diagram of an example of a drying module for a drying unit.

FIG. 1*c* shows a block diagram with examples of components of a drying module 160. The drying module 160 depicted in FIG. 1*c* comprises a blower 165 with which a gaseous medium, in particular air, can be directed past a heating element 162. The drying medium 164 warmed by the heating element 162 is then blown via one or more openings or nozzles 163 onto the surface of the recording medium 120. The delivery rate of the blower 165 and/or the heating capacity of the heating element 162 can be controlled or regulated via a control module 161 of the drying module 160, wherein the control module 161 can, if applicable, be part of the control unit 101 of the drying unit 160 or of the printing device 100. In particular, the real temperature in the environment of the recording medium 120 can be detected by means of a temperature sensor 166*a* arranged outside of the drying module 160. Alternatively or in combination, the real temperature in the drying module 160 can be measured by means of a temperature sensor 166*b* arranged within said drying module 160. The control module 161 can be configured to control or regulate the blower 165 and/or the one or more heating elements 162 depending on sensor data of the temperature sensor 166, in particular depending on the detected real temperature. For example, a defined nominal temperature in the environment of the recording medium 120 can thus be set. The nominal temperature in the environment of the recording medium 120 can be determined, for example, on the basis of the measured value of the temperature of the unprinted recording medium 120. The temperature sensor 151*b* can alternatively or in combination be arranged in the drying module 160.

A contactless float drying by means of a forced convection can thus be used to dry a recording medium 120. As depicted in FIG. 1*b*, for this purpose the individual drying modules 160 are arranged alternately on the front side and back side of the recording medium 120 along the drying route. The recording medium 120 can then be pushed or pulled through the drying unit 150, past the drying modules 160, while floating.

The quantity of thermal energy that is supplied to the recording medium 120 to dry a print image within the drying unit 150 can be set, in particular can be controlled and/or regulated, such that on the one hand the print image is reliably and efficiently dried or fixed, and on the other hand an optimally small negative effect on the recording medium 120 is produced. In order to enable an optimally short drying route, it is advantageous to bring the temperature of the recording medium 120 optimally close to a defined limit temperature during the drying process. On the other hand, the limit temperature should not be exceeded, in order to avoid damage to the recording medium 120. Given paper, for example, the limit temperature can be at approximately 160° C.

The drying unit 150 can comprise a temperature sensor 151*a* that is configured to acquire sensor data with regard to the temperature of the recording medium 120. In this document, the sensor data of the temperature sensor 151 are also referred to as temperature data. The temperature sensor 151 can be arranged at a defined distance above the edge of the recording medium 120. An unprinted measurement stripe with a defined width, for example 12 cm, can be provided at the edge of the recording medium 120 in order to enable the temperature sensor 151 to at least intermittently acquire temperature data, i.e. measured values, with regard to the temperature of the unprinted recording medium 120.

A control unit 101, 161 of the drying unit 150 can be configured to operate the one or more drying modules 160 of the drying unit 150 depending on the temperature data. Temperature data with regard to the unprinted recording medium 120, in particular with regard to the unprinted measurement stripes, are thereby preferably used in order to effect an optimally precise and robust control and/or regulation of the one or more drying modules 160.

Figure 1D:
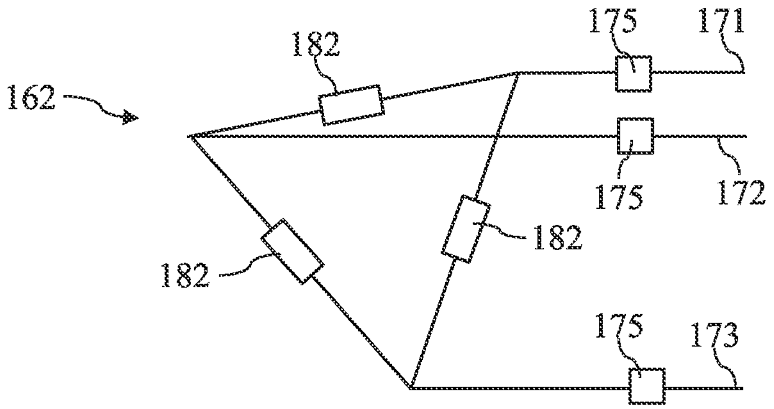
FIG. 1*d* an example of a heating element for a drying module.

FIG. 1*d* shows an example of a heating element 162 that has three heating resistors 182 that are arranged in a delta connection. The individual mid-points between two respective heating resistors 182 can respectively be coupled via a switching element 175, for example via a relay, with one phase 171, 172, 173 of a multi-phase, in particular three-phase, alternating current. The switching element 175 can be closed to activate the heating element 162. The switching of the individual switching elements 175 thereby preferably takes place upon a zero-crossing of the respective phase 171, 172, 173 such that, to activate the heating element 162, first the switching element 175 of the first phase 71 is closed, then the switching element 175 of the second phase 172 is closed with a phase offset of, for example, 120°, and finally the switching element 175 of the third phase 173 is closed with an additional phase offset of, for example, 120°. A phase-offset opening of the individual switching elements 175 can also take place accordingly in order to deactivate the heating element 162.

The phase-offset opening and closing of the individual switching elements 175 can lead to a non-uniform loading of the three-phase alternating current supply network, and thus to an additional adjustable short, during the period in which the heating element 162 is activated or deactivated. Consequently, it is typically advantageous to reduce the number of activations and deactivations of the individual heating elements 162 of a drying unit 150 in order to reduce the loading of the supply network that is produced by the drying unit 150.

To operate the heating elements 162 of the individual drying modules 160 of the drying unit 150, a respective measured value of the temperature of the recording medium 120 can be acquired at a defined measuring frequency, for example 1 Hz, using the temperature sensor 151 of the drying unit 150. The nominal temperature for the individual drying modules 160 can be determined on the basis of the measured value of the temperature, from which nominal temperature a control value for the heating element 162 of the respective drying module 160 can be determined under consideration of the respective real temperature which, for example, is detected by the temperature sensor 166 of the respective drying module 160. The control value can indicate for what portion of a heating cycle the heating element 162 of the respective drying module 160 should be active. A heating cycle can thereby extend beyond a defined number N of successive full or half-periods of the alternating current, in particular of the three-phase alternating current. For example, a heating cycle can comprise N=25 full periods or N=50 half-periods. The control value for a heating element 162 can thus indicate for how many full or half-periods of a heating cycle the heating element 162 should be active. In other words, the control value for a heating element 162 can indicate the number T of full or half-periods of a heating cycle in which the heating element 162 should be active.

A respective control value that indicates for how many full or half-periods of a heating cycle the respective heating element 162 should be active can thus be determined repeatedly, in particular periodically with a defined control frequency, for the individual heating elements 162 of the drying unit 150. For example, the activation matrix 200 depicted in FIG. 2 can then be used in order to determine the full or half-periods of the heating cycle in which the respective heating element 162 is active or inactive. The activation matrix 200 depicted in FIG. 2 has different columns for different full or half-periods 201 of the heating cycle. The activation matrix 200 also has different rows for different levels of control values L, for example from 0% to 100%. The individual matrix cells 205 indicate whether the heating element 162 should be active in the respective full or half-periods 201 of the heating cycle (light cell) or inactive (dark-shaded cell).

Figure 2:
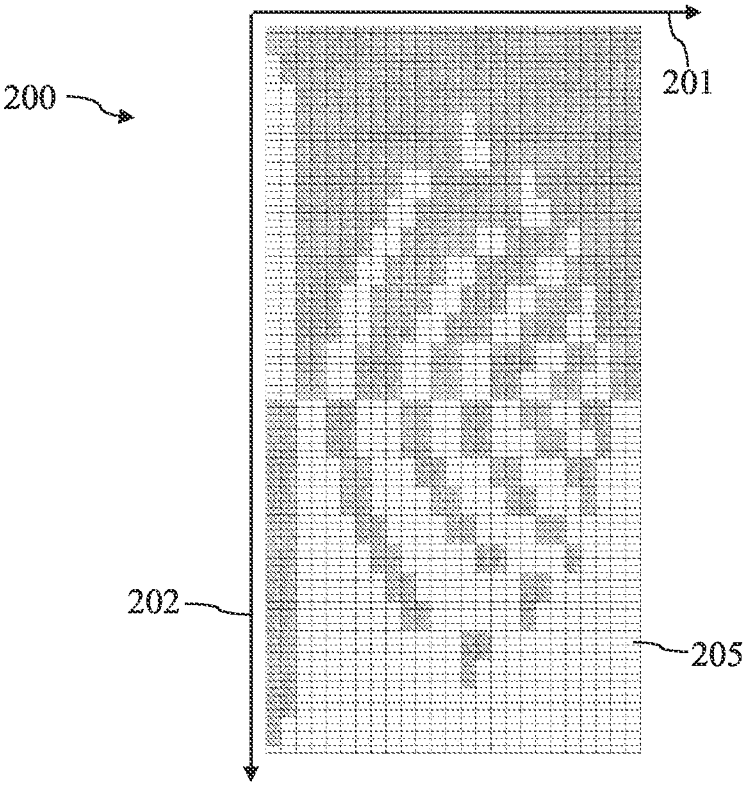
FIG. 2 an example of a control matrix for power-dependent control of the heating element.

The use of the activation matrix 200 depicted in FIG. 2 leads to a relatively high number of activations and deactivations of the individual heating elements 162, since the individual heating elements 162 can be activated and deactivated multiple times within a heating cycle, in particular given medium-sized control values L. As explained above, this can lead to a relatively high reactive power, and thus to a relatively high loading of the supply network. The activation matrix 200 depicted in FIG. 2 can also lead to the situation that a relatively high number of heating elements 162 is active simultaneously, which leads to a relatively high power consumption of the drying unit 150 and thus to a relatively high loading of the supply network.

The activation of the individual heating elements 162 can in particular be optimized in that

- the number of switching process is halved, in that the shortest activation duration of a heating element 162 is not a half-wave, i.e. a half-period, but rather a full wave, i.e. a full period. The duration of a heating cycle is thereby extended, for example to 500 ms, which, however, can be compensated for by the relatively high thermal capacity of the individual heating elements 162 and/or drying modules 160.
- the switching process are reduced in that the activation times of a heating element 162 in a heating cycle are merged into a block. The distribution of the heating power within a heating cycle is thereby modified, which, however, can be compensated for by the relatively high thermal capacity of the individual heating elements 162 and/or drying modules 160.
- the switching processes of the individual heating element 162, in particular the blocks in which the individual heating elements 162 are active, are distributed within a heating cycle such that the power consumption of the drying unit 150 within the entire heating cycle remains optimally constant.

FIG. 3 shows an example of an activation matrix 300 for driving a plurality of heating elements 162 within a heating cycle. In the depicted example, the heating cycle comprises N=25 full periods 201 or full waves of the alternating current. M=11 heating elements 162 are also driven. For the individual heating elements 162, a respective control value L is determined, for example on the basis of the measured value of the temperature of the recording medium 120 and/or on the basis of the real temperature at the respective drying module 160. In the depicted example, the control value L of the first heating element 162, is in the first row, for example L=4, which indicates that the heating element 162 should be active for 4% of the heating cycle, i.e. for precisely one full period, i.e. T=1. The third heating element 162, in the third row (M=3), has a control value L of 40%, for example, which indicates that the heating element 162 should be active for 40% of the heating cycle or for T=10 full periods. The number T of full periods is depicted in the second column of the matrix 300.

A respective block 206 of periods 201 that has a number T of periods 201 dependent on the control value L can thus be defined for the individual heating elements 162. The blocks 306 of the individual heating elements 162 can be arranged in chronological succession within the heating cycle, such that the block 306 of the second heating element 162 directly follows the block 306 of the first heating element 162, followed by the block 306 of the third heating element 162 etc. If a block 306 reaches the end of the heating cycle, the remaining portion of this block 306 can be continued again at the start of the heating cycle. The respective cumulative sum S of active periods 201, and the offset V of the respective block 306 within the heating cycle, are specified in the activation matrix 300 from FIG. 3.

By sequentially stringing together the active and/or heating blocks 306 of the individual heating elements 162, as described above, it can be effected that the number R 305 of active heating elements 162 within the individual periods 201 of the heating cycle remains nearly constant. As a result of this, a nearly constant power consumption of the drying unit 150 can be effected over the time of a heating cycle.

For each drying module 160, a calculation can thus initially be made of how many full waves 201 need to be activated in the cycle in order to achieve the heating power requested by the respective drying module 160. Since the cycle in the shown example consists of N=25 full waves 201, the power levels may be activated in 4%-steps between 0% and 100% of the maximum available heating power.

In the depicted example, the heating element 162 of the first drying module 160 has a 4% duty cycle, which means that T=1 full wave 201 is to be driven. The heating element 162 of the second drying module 160 should be driven with an 8% duty cycle, thus with T=2 full waves, etc.

The heating element 162 of the first drying module 160 is activated at the 0th full wave of the heating cycle, and the heating element 162 of the second drying module 160 is activated when the heating element 162 of the first drying module 160 is deactivated, thus at the 1st full wave of the heating cycle. The heating element 162 of the third drying module 160 starts at the 3rd full wave and ends with the 12th full wave. The heating element 162 of the fourth drying module 160 starts at the 13th full wave and ends with the 22nd full wave. The heating element 162 of the fifth drying module 160 starts at the 23rd full wave and ends with the 24th full wave, the last full wave of the heating cycle. Since only 2 of the 9 necessary full waves for this heating element 162 are thereby considered, the 7 as of yet unconsidered full waves are started again with full wave 0 of the heating cycle and end with full wave 6. This means that duty cycles after the 24th full wave, i.e. at the end of the heating cycle, are transferred forward, i.e. to the start of the heating cycle.

The table 300 is filled up to the last drying module 160 of the drying unit 150. Under certain circumstances, full waves of the heating cycle in which no further heating elements 162 need to be activated any more remain at the end.

The different rows of the table 300 depicted in FIG. 3 correspond to the individual drying modules 160. The desired activation duration, or the control value L, for the heating element 162 of the respective drying module 160 is in the first column. The 2nd column indicates the number T of full waves 201 for which the heating element 162 of the respective drying module 160 must be activated in the heating cycle. The 3rd column contains the sum S of the previously required active full waves 201. When the heating element 162 of the respective drying module 160 must be activated in the heating cycle can be calculated from this sum S via a modulo calculation. This value V is in the 4th column of the table 300. The heating element number M is given in the 5th column.

When which drying module 160 is activated is entered in the following columns. How many nozzle boxes are activated simultaneously in the corresponding full wave is in the last row.

Via the described method, it is ensured that a switched-off heating element 162 is activated when a different heating element 162 is deactivated and that, in every full wave 201, optimally the same number of heating elements 162—for example 4 or 3 heating elements 162—are active at the end of the cycle.

A device 101, 161 is thus described for controlling a plurality of heating elements 162 of a drying unit 150 to dry a recording medium 120 printed to by a printing device 100. The plurality of heating elements 162 can, for example, comprise M=4 or more, or M=8 or more, or M=12 or more heating elements 162. The drying unit 150 can comprise a plurality of drying modules 160 that are arranged along a drying route, for example, as described in conjunction with FIG. 1*b*. The individual drying modules 160 can respectively comprise a heating element 162. The individual heating elements 162 can respectively be operated with an alternating current, in particular with a multi-phase alternating current, for instance a three-phase alternating current. The individual heating elements 162 can also respectively have at last one heating resistor 182, for example as described in conjunction with FIG. 1*d*.

The device 101, 161 is configured to determine, for each of the plurality of heating elements 162, a respective number T of periods 201 of the alternating current for which the respective heating element 162 should be active in a heating cycle. A heating cycle can thereby comprise a sequence of successive full or half-periods 201 of the alternating current. For every single heating element 162, the fraction L of periods 201 of the heating cycle in which the respective heating element 162 should be active can thus be determined.

A heating cycle can, for example, comprise N periods 201 of the alternating current, for instance N=10 or more periods 201, or N=20 or more periods 201. For example, for how many of the N periods 201 the respective heating element 162 should be active can be determined for every single heating element 162.

The device 101, 161 can be configured to determine a respective nominal temperature for the respective heating element 162, in particular based on a measured value of the temperature of the recording medium 120, for each of the plurality of heating elements 162. Furthermore, a respective real temperature can be determined for the respective heating element 162, in particular using a temperature sensor 166 for the respective heating element 162. The number T of periods 201 of the alternating current for which the respective heating element 162 should be active in the heating cycle can then be determined precisely on the basis of the nominal temperature and on the basis of the real temperature, in particular using a regulator.

Furthermore, the device 101, 161 can be configured to determine, for each of the plurality of heating elements 162, a respective heating block 306 within the heating cycle for the respective heating element 162, wherein the heating block 306 has precisely the number T of periods 201 of the alternating current as was determined for the respective heating element. In other words, the periods 201 in which the respective heating element 162 should be active can respectively be merged into a contiguous heating block 306.

The device 101, 161 can thereby be configured to determine the heating block 306 for a heating element 162 such that the heating block 306 corresponds, in particular precisely corresponds, to a contiguous section of the sequence of successive periods 201 of the heating cycle that has precisely the number T of periods 201 of the alternating current as was determined for the heating element 162. Alternatively, the device 101, 161 can be configured to determine the heating block 306 for a heating element 162 such that the heating block 306 is composed of a first partial section from the sequence of successive periods 201 of the heating cycle at the start of the heating cycle and a second partial section from the sequence of successive periods 201 of the heating cycle at the end of the heating cycle, so that the first partial section and the second partial section together have precisely the number T of periods 201 of the alternating current as was determined for the heating element 162.

As was already explained further above, the heating cycle can have a sequence of N periods 201 of the alternating current or correspond to a sequence of N periods 201 of the alternating current. The individual periods 201 can be identifiable with an index number n=0, . . . , N−1 within the sequence of periods 201.

The device 101, 161 can then be configured to select, for the heating block 306 for a heating element 162 for which a number T of periods 201 has been determined, a contiguous section of T directly successive periods 201 from the sequence of N periods 201. Alternatively, the device 101, 161 can be configured to select, for the heating block 306 for a heating element 162, a first partial section from the periods 201 n=0, . . . , K at the start of the heating cycle, and a second partial section of the periods 201 n=Q, . . . , N−1 at the end of the heating cycle, such that K+N−Q+1=T.

A respective contiguous heating block 306 with T successive periods 201 can thus be established for every single heating element 162, wherein T is the determined number T of periods 201 for the respective heating element 162. A contiguous heating block 306 can thereby also be created via a “modulo” connection between the end of the heating cycle and the start of the heating cycle.

The device 101, 161 is also configured to effect that the respective heating element 162 is active in the zero, one, or more—i.e. in the T—periods 201 of the heating cycle that are indicated by the determined heating block 306, and is inactive in the zero, one, or more—i.e. in the N−T—periods 201 of the heating cycle outside of the determined heating block 306.

A device 101, 161 is thus described that is designed to activate the different heating elements 162 of a drying unit 150 respectively per block within a heating cycle in order to enable an operation of the drying unit 150 that is particularly power-efficient and gentle on the mains.

The heating elements 162 can be operated accordingly in successive heating cycles. An long-term, stable, and efficient operation of the drying unit 150 can thus be enabled.

The device 101, 161 can thus be configured to determine and/or arrange the plurality of heating blocks 306 for the corresponding plurality of heating elements 162 such that at least a portion of the plurality of heating elements 162 is activated precisely once within the heating cycle, in particular at the start of the determined heating block 306 for the respective heating element 162, and is deactivated precisely once, in particular at the end of the determined heating block 306 for the respective heating element 162. Alternatively or additionally, the device 101, 161 can be configured to determine and/or arrange the plurality of heating blocks 306 for the corresponding plurality of heating elements 162 such that each of the plurality of heating elements 162 is activated at most twice and deactivated at most twice within the heating cycle. A particularly low mains loading can be effected via the limited number of activations or deactivations of the individual heating elements 162.

The device 101, 161 can be configured to arrange the plurality of heating blocks 306 for the corresponding plurality of heating elements 162 in a distributed manner within the heating cycle such that the respective number of active heating elements 162 in the individual periods 201 of the sequence of periods 201 of the heating cycle assumes either a whole-number value R or a whole-number value R−1 for all periods 201 of the sequence of periods 201 of the heating cycle.

In other words, the heating blocks 306 of the individual heating elements 162 can be distributed within the heating cycle such that, if possible, the same number R of heating elements 162 is always active in the individual periods 201 of the heating cycle, and thus the heating power consumed by the drying unit 150 is constant over time. As an exception, the number R−1 of active heating elements 162 can be acceptable in one or more periods 201 since, due to the values of N, M, and T, where applicable no completely uniform distribution of the heating power to be consumed is possible.

Via such a uniform distribution of the heating blocks 306, the power efficiency of the drying unit 150 can be increased further, and the loading of the supply network can be further reduced.

The individual heating elements 162 of the plurality of heating elements 162 can be identifiable with an index number m=1, . . . , M within the drying unit 150. The index number m can, if applicable, indicate the position of the heating element 162 along the drying route of the drying unit 150. The device 101, 162 can be configured to arrange the heating blocks 306 of the M heating elements 162 using one or more of the following rules:

- a rule to the effect that the heating block 306 for the heating element 162 having the index number m=1 is arranged beginning with the period 201 having the index number n=0.
- a rule to the effect that the heating blocks 306 for the subsequent heating elements 162, following the heating element 162 having the index number m=1, are arranged sequentially with increasing index number m.
- a rule to the effect that, if the heating block 306 for the heating element 162 having the index number m ends at the period 201 having the index number n<N−1, the heating block 306 for the directly following heating element 162 having the index number m+1 is arranged beginning with the directly following period 201 having the index number n+1.
- a rule to the effect that, if the heating block 306 for the heating element 162 having the index number m ends at the period 201 having the index number N−1, the heating block 306 for the directly following heating element 162 having the index number m+1 is arranged beginning with the directly following period 201 having the index number 0.

a rule to the effect that, if the heating block 306 for the heating element 162 having the index number m that has been arranged beginning at the period 201 having the index number n is so long that the heating block 306 would end at a period 201 having an index number n>N−1, a first partial segment of the heating block 306 is arranged at the periods 201 n to N−1, and a remaining second partial segment of the heating block 306 is arranged beginning with the period 201 having the index number 0, a rule to the effect that the heating block 306 for the heating element 162 having the index number m is arranged beginning at a period 201 having the index number n, which is determined based on the sum S of the numbers T of the periods 201 of the one or more heating elements 162 having the index number 1 to m−1. The index number n can thereby in particular be determined on the basis of the result of the modulo operation: S mod N, for instance as n=S mod N−1.

The individual heating blocks 306 can thus be arranged sequentially in the heating cycle. Upon achieving the end of the heating cycle, a "modulo" connection to the start of the heating cycle can thereby be effected so that a remaining heating block 306 can at least in part be placed at the start of the heating cycle again. The individual periods 201 of the heating cycle can thus, if applicable, be populated R times or (R−1) times with heating blocks 306 so that R or R−1 heating elements 162 are operated simultaneously in the individual periods 201. A uniform distribution of the heating blocks 306 can be particularly reliably effected via the aforementioned distribution method.

The device 101, 161 can be configured to determine and/or arrange the plurality of heating blocks 306 for the corresponding plurality of heating elements 162 such that each of the plurality of heating elements 162 is activated or deactivated at most once within any full period 201 of the heating cycle. The activation or the deactivation thereby preferably takes place at a zero crossing of the respective full period 201. The mains loading by the drying unit 150 can thus be further reduced.

Furthermore, a drying unit 150 and/or a printing device 100 that comprise the device 101, 161 are described in this document.

Figure 4:
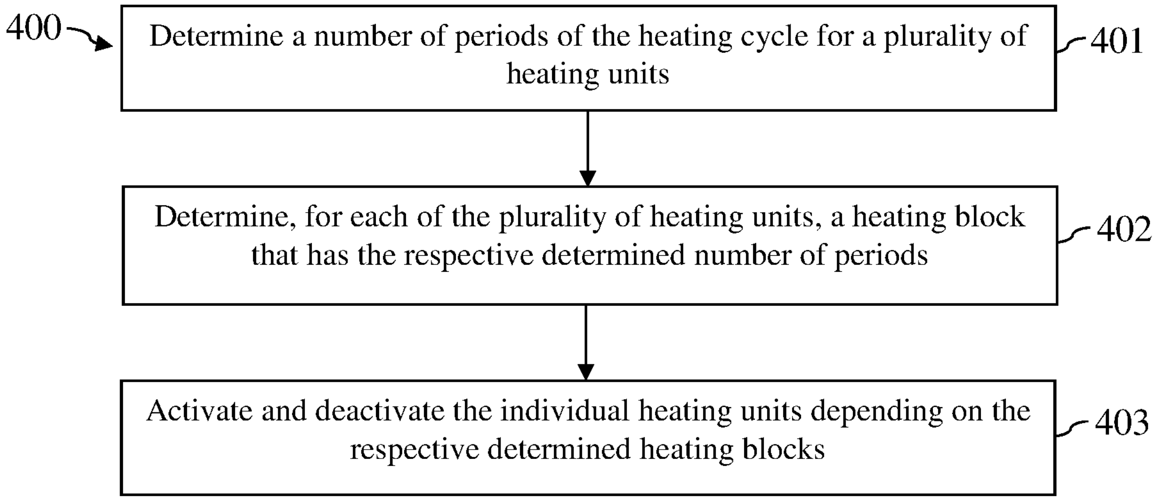
FIG. 4 a workflow diagram of an example of a method for controlling a plurality of heating elements of a drying unit.

FIG. 4 shows a workflow diagram of an example of a method 400, if applicable a computer-implemented method 400, for controlling a plurality of heating elements 162 of a drying unit 150 to dry a recording medium 120 printed to by a printing device 100. The plurality of heating elements 162 can be arranged in a corresponding plurality of drying modules 160. The heating elements 162 can respectively be operated with an alternating current, in particular with a multi-phase alternating current.

The method 400 comprises, for each of the plurality of heating elements 162, the determination 401 of a respective number T of periods 201 of the alternating current for which the respective heating element 162 should be active in a heating cycle, wherein the heating cycle comprises a sequence of N successive periods 201 of the alternating current. In what fraction L of the heating cycle the respective heating element 162 should be activated can thus be determined. This can be determined on the basis of a current measured value of the temperature of the recording medium 120 within the drying unit 150.

Furthermore, the method 400 comprises the determination 402 of a heating block 306 within the heating cycle for the respective heating element 162, wherein the heating block 306 respectively has precisely the number T of periods 201 of the alternating current that was determined for the respective heating element 162. Precisely one contiguous heating block 306 that comprises a section of the sequence of N successive periods 201 of the heating cycle is preferably determined for each heating element 162. The second can thereby, if applicable, be composed of two partial sections that are arranged at the end or at the start of the heating cycle, and that thus connect via a "modulo" operation that links the end of the heating cycle with the start of the heating cycle.

The method 400 also comprises effecting 403 that the respective heating element 162 is active in the zero, one, or more—i.e. in the T—periods 201 of the heating cycle that are indicated by the determined heating block 306, and is inactive in the zero, one, or more—i.e. in the N−T—periods 201 of the heating cycle outside of the determined heating block 306. The individual heating elements 162 can thus be respectively activated for all T periods 201 from the respective heating block 306, and be inactive for all N−T periods 201 outside of the respective heating block 306.

An operation of a drying unit 150 that is particularly power-efficient and gentle on the mains can be enabled via the measures described in this document.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For the purposes of this discussion, the terms "controller", "control unit" or "device for controlling" shall be understood to be circuit(s) or processor(s), or a combination thereof, including memory storing instructions. A circuit includes an analog circuit, a digital circuit, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor.

REFERENCE LIST

1 transport direction
21, 22 nozzle (print image)
31, 32 column (of the print image)
100 printing device
101 control unit
102 print bar
103 print head
120 recording medium
140 print group
150 fixing or drying unit
151 temperature sensor
160 drying module
161 control module
162 heating element
163 nozzle
164 tempered drying medium (air)
165 blower
166 temperature sensor
171-173 phase
175 switching element (relay)
182 heating resistor
200 activation matrix (for a heating element)
201 (full or half-) period within a heating cycle L control value (fraction of the active full or half-periods in a heating cycle)

205 activation matrix cell

300 activation matrix (for a plurality of heating elements)

T number T of (full or half-) periods

S cumulative number or sum S of (full or half-) periods

V offset within the sequence of (full or half-) periods of a heating cycle

305 number R of simultaneously active heating elements

306 contiguous block of active (full or half-) periods

400 method for controlling a plurality of heating elements of a drying unit

401-403 method steps

The invention claimed is:

1. A device for controlling a plurality of heating elements of a drying unit to dry a recording medium printed to by a printing device; wherein the heating elements are respectively operated with an alternating current; wherein the device is configured, for each of the plurality of heating elements, to determine a respective number (T) of periods of the alternating current for which the respective heating element should be active in a heating cycle; wherein the heating cycle comprises a sequence of successive periods of the alternating current;

to determine a heating block within the heating cycle for the respective heating element, which heating block has precisely the number (T) of periods of the alternating current that was determined for the respective heating element; and to effect that the respective heating element is active in zero, one, or more periods of the heating cycle that are indicated by the determined heating block, and is inactive in the zero, one, or more periods of the heating cycle outside of the determined heating block.

2. The device according to claim 1, wherein the device is configured to determine the heating block for each of the plurality of heating elements such that the heating block corresponds to a contiguous section of the sequence of successive periods of the heating cycle that has precisely the number (T) of periods of the alternating current as was determined for the heating element; or the heating block is composed of a first partial section from the sequence of successive periods of the heating cycle at a start of the heating cycle and a second partial section from the sequence of successive periods of the heating cycle at an end of the heating cycle, so that the first partial section and the second partial section together have precisely the number (T) of periods of the alternating current as was determined for the heating element.

3. The device according to claim 1, wherein the heating cycle has a sequence of N periods of the alternating current;

individual periods having an index number n=0, . . . , N−1 are identifiable within the sequence of successive periods; and the device is configured to, for the heating block for a heating element for which a number (T) of periods has been determined, select a contiguous section of T directly successive periods from the sequence of N periods; or select a first partial section n=0, . . . , K at the start of the heating cycle and a second partial section of the periods n=Q, . . . , N−1 at the end of the heating cycle, such that K+N−Q+1=T.

4. The device according to claim 1, wherein the device is configured to arrange the plurality of heating blocks for the corresponding plurality of heating elements distributed within the heating cycle such that a respective number of active heating elements in individual periods of the sequence of periods of the heating cycle assumes either a whole-number value R or a value R−1 for all periods of the sequence of periods of the heating cycle.

5. The device according to claim 3, wherein the individual heating elements of the plurality of heating elements are identifiable with an index number m=1, . . . , M within the drying unit;

individual periods of the sequence of periods of the heating cycle are identifiable with an index number n=0, . . . , N−1 within the sequence of periods of the heating cycle; and the device is configured to arrange the heating blocks of the M heating elements within the heating cycle such that the heating block for the heating element having the index number m=1 is arranged beginning with the period having the index number n=0; and/or the heating blocks for the subsequent heating elements are arranged sequentially with increasing index number m; and/or if the heating block for the heating element having the index number m ends at the period having the index number n<N−1, the heating block for the directly following heating element having the index number m+1 is arranged beginning with the directly following period having the index number n+1; and/or if the heating block for the heating element having the index number m ends at the period having the index number N−1, the heating block for the directly following heating element having the index number m+1 is arranged beginning with the period having the index number 0; and/or if the heating block for the heating element having the index number m, which was arranged beginning at the period having the index number n, is of such a length that the heating block would end at a period having an index number n>N−1, a first partial segment of the heating block is arranged at the periods n to N−1, and a remaining second partial segment of the heating block is arranged beginning with the period having the index number 0; and/or the heating block for the heating element having the index number m is arranged beginning at the period having the index number n, wherein n=S mod N−1, and wherein the sum (S) is the number (T) of periods of the heating blocks for the one or more heating elements having the index numbers 1 to m−1.

6. The device according to claim 5, wherein the plurality of heating elements comprises M=4 or more, or M=8 or more, or M=10 or more heating elements; and/or the heating cycle comprises N=10 or more periods, or N=20 or more periods of the alternating current.

7. The device according to claim 1, wherein the device is configured to, for each of the plurality of heating elements, determine a respective nominal temperature for the respective heating element on the basis of a measured value of a temperature of the recording medium;

determine a respective real temperature for the respective heating element using a temperature sensor for the respective heating element; and determine the number (T) of periods of the alternating current for which the respective heating element should be active in the heating cycle, on the basis of the nominal temperature and on the basis of the real temperature using a regulator.

8. The device according to claim 1, wherein the device is configured to determine and/or arrange the plurality of heating blocks for the corresponding plurality of heating elements such that at least a portion of the plurality of heating elements within the heating cycle is activated precisely once at a start of the determined heating block for the respective heating element, and is deactivated precisely once at an end of the determined heating block for the respective heating element; and/or each of the plurality of heating elements is activated at most twice and deactivated at most twice within the heating cycle.

9. The device according to claim 1, wherein the device is configured to determine and/or arrange the plurality of heating blocks for the corresponding plurality of heating elements such that each of the plurality of heating elements is activated or deactivated at most once within any full period of the heating cycle.

10. A method for controlling a plurality of heating elements of a drying unit for drying a recording medium printed to by a printing device; wherein the heating elements are respectively operated with an alternating current; wherein the method comprises, for each of the plurality of heating elements, determination of a respective number (T) of periods of an alternating current for which the respective heating element should be active in a heating cycle; wherein the heating cycle comprises a sequence of successive periods of the alternating current;

determination of a heating block within the heating cycle for the respective heating element, which heating block has precisely the number (T) of periods of the alternating current as was determined for the respective heating element; and effecting that the respective heating element is active in the zero, one, or more periods of the heating cycle that are indicated by the determined heating block, and is inactive in the zero, one, or more periods of the heating cycle outside of the determined heating block.

* * * * *